US009153995B2

(12) United States Patent  (10) Patent No.: US 9,153,995 B2
Walley et al.  (45) Date of Patent: Oct. 6, 2015

(54) SMART POWER DELIVERY SYSTEM AND RELATED METHOD

(75) Inventors: John Walley, Ladera Ranch, CA (US); Robert Hulvey, Redondo Beach, CA (US)

(73) Assignee: BROADCOM CORPORATION, Irvine, CA (US)

(*) Notice: Subject to any disclaimer, the term of this patent is extended or adjusted under 35 U.S.C. 154(b) by 270 days.

(21) Appl. No.: 12/987,802

(22) Filed: Jan. 10, 2011

(65) Prior Publication Data

US 2011/0181110 A1 Jul. 28, 2011

Related U.S. Application Data

(60) Provisional application No. 61/336,844, filed on Jan. 26, 2010.

(51) Int. Cl.
*H02J 3/00* (2006.01)
*H02J 3/14* (2006.01)
(Continued)

(52) U.S. Cl.
CPC . *H02J 7/022* (2013.01); *G06F 1/26* (2013.01); *H02J 7/008* (2013.01); *H02J 7/025* (2013.01); *H02J 7/0021* (2013.01); *Y10T 307/406* (2015.04)

(58) Field of Classification Search
CPC .............. H02J 2007/0096; H02J 2007/0098; H02J 2007/62; H02J 7/0055; H02J 7/02; H02J 7/025; H02J 7/008; H02J 5/005; H02J 7/0026; H02J 7/0003; H02J 7/0068; H02J 7/0031; G06F 1/1632; G06F 1/26
USPC .............. 340/3.1, 500, 540, 657, 7.33, 13.23, 340/572.1, 825.25, 636.2; 455/572, 574, 455/512, 522, 127.1, 343.1, 423, 573; 307/31–41, 126, 311, 150, 66, 29, 104; 363/52, 44, 76, 13; 320/103, 107, 108, 320/137, 150, 119, 124, 134
See application file for complete search history.

(56) References Cited

U.S. PATENT DOCUMENTS 6,246,211 B1 6/2001 Dalton et al.
6,255,800 B1 7/2001 Bork
(Continued)

OTHER PUBLICATIONS

"Combined Antenna and Inductive Power Receiver" Ben-Shalom, et al. Apr. 1, 2010 <http://www.sumobrain.com/patents/wipo/Combined-antenna-inductive-power-receiver/WO2010035256.html>.
(Continued)

*Primary Examiner* — Mirza Alam
(74) *Attorney, Agent, or Firm* — Oblon, McClelland, Maier & Neustadt, L.L.P.

(57) ABSTRACT

According to one disclosed embodiment, a smart power delivery system includes a power conversion unit having a communication module and a power management module that can convert mains power into an optimized voltage and limited current used to power an electronic device. In one embodiment, a power conversion unit can optimize an output voltage by communicating with a connected electronic device and exchanging parameters representing desired characteristics of the output voltage. In one embodiment, an electronic device receives power from a power conversion unit through a wired power conduit. In another embodiment, an electronic device receives power from a power conversion unit through a wireless power conduit. In one embodiment, an optimal voltage is selected after negotiation between multiple electronic devices and a power conversion unit.

20 Claims, 5 Drawing Sheets

(51) Int. Cl.
*H02M 1/12* (2006.01)
*H02M 3/24* (2006.01)
*H02J 7/00* (2006.01)
*H02J 7/02* (2006.01)
*G06F 1/26* (2006.01)

(56) References Cited

U.S. PATENT DOCUMENTS

| | | | | |
|---|---|---|---|---|
| 6,754,092 | B2* | 6/2004 | McDowell et al. | 363/89 |
| 7,766,698 | B1* | 8/2010 | De Iuliis et al. | 439/638 |
| 2002/0174408 | A1* | 11/2002 | Naffziger et al. | 716/5 |
| 2006/0271800 | A1* | 11/2006 | Li et al. | 713/300 |
| 2008/0014897 | A1* | 1/2008 | Cook et al. | 455/343.1 |
| 2008/0081676 | A1* | 4/2008 | Chakraborty et al. | 455/574 |
| 2008/0106148 | A1 | 5/2008 | Gelonese | |
| 2009/0212751 | A1* | 8/2009 | Cervera et al. | 323/268 |
| 2009/0235107 | A1* | 9/2009 | Gelonese | 713/340 |
| 2009/0271047 | A1* | 10/2009 | Wakamatsu | 700/295 |
| 2009/0284245 | A1* | 11/2009 | Kirby et al. | 323/318 |
| 2010/0019583 | A1* | 1/2010 | DuBose et al. | 307/126 |
| 2010/0146308 | A1* | 6/2010 | Gioscia et al. | 713/300 |
| 2010/0244576 | A1* | 9/2010 | Hillan et al. | 307/104 |
| 2011/0260556 | A1* | 10/2011 | Partridge et al. | 307/150 |

OTHER PUBLICATIONS

"Verizon LG Decoy Cell Phone Integrated Bluetooth Headset Now Available" Andrew Tingle Jun. 17, 2008 <http://nexus404.com/Blog/2008/06/17/verizon-lg-decoy-cell-phone-integrated-bluetooth-headset-now-available-lg-vx8610-multimedia-handset-hits-verizon/>.

* cited by examiner

SMART POWER DELIVERY SYSTEM AND RELATED METHOD

RELATED APPLICATIONS

This application is based on and claims priority from U.S. Provisional Patent Application Ser. No. 61/336,844, filed on Jan. 26, 2010, which is hereby incorporated by reference in its entirety.

BACKGROUND OF THE INVENTION

1. Field of the Invention

The present invention is generally in the field of electronic devices and systems. More particularly, the present invention is in the field of delivery of power to electronic devices and systems.

2. Background Art

The use of electronic devices continues to expand into all aspects of daily life, from the ubiquitous cell phone to the sensors that automatically dispense soap in public bathrooms. Many such devices are kept in a mode of constant readiness for use, and the cumulative effect of this mode and the ever-increasing number of devices is a heavy burden on existing energy resources.

Conventional power supplies for electronic devices are typically inefficient and unconfigurable, mainly to reduce manufacturing cost, but also because general safety and liability concerns steer manufacturers towards designing their power supplies to be physically differentiated from product to product so as to limit the risk of damage due to incompatible voltage and current specifications. Because each power supply is designed to serve only a very limited market for a limited amount of time (e.g., the life of a single product), little effort is put into designing high efficiency and accuracy into each iteration of the generic power supply. Further, the lack of interchangeability typically leads to consumers having multiple collections of power supplies at, for example, home and work, and each collection is often left plugged into the mains, which constantly draws power from the grid.

Thus, there is a need to overcome the drawbacks and deficiencies in the art by providing a power delivery system that can be readily adapted to power electronic devices efficiently, accurately and safely.

SUMMARY OF THE INVENTION

The present invention is directed to a smart power delivery system and related method, substantially as shown in and/or described in connection with at least one of the figures, as set forth more completely in the claims.

DETAILED DESCRIPTION OF THE INVENTION

Figure 1:
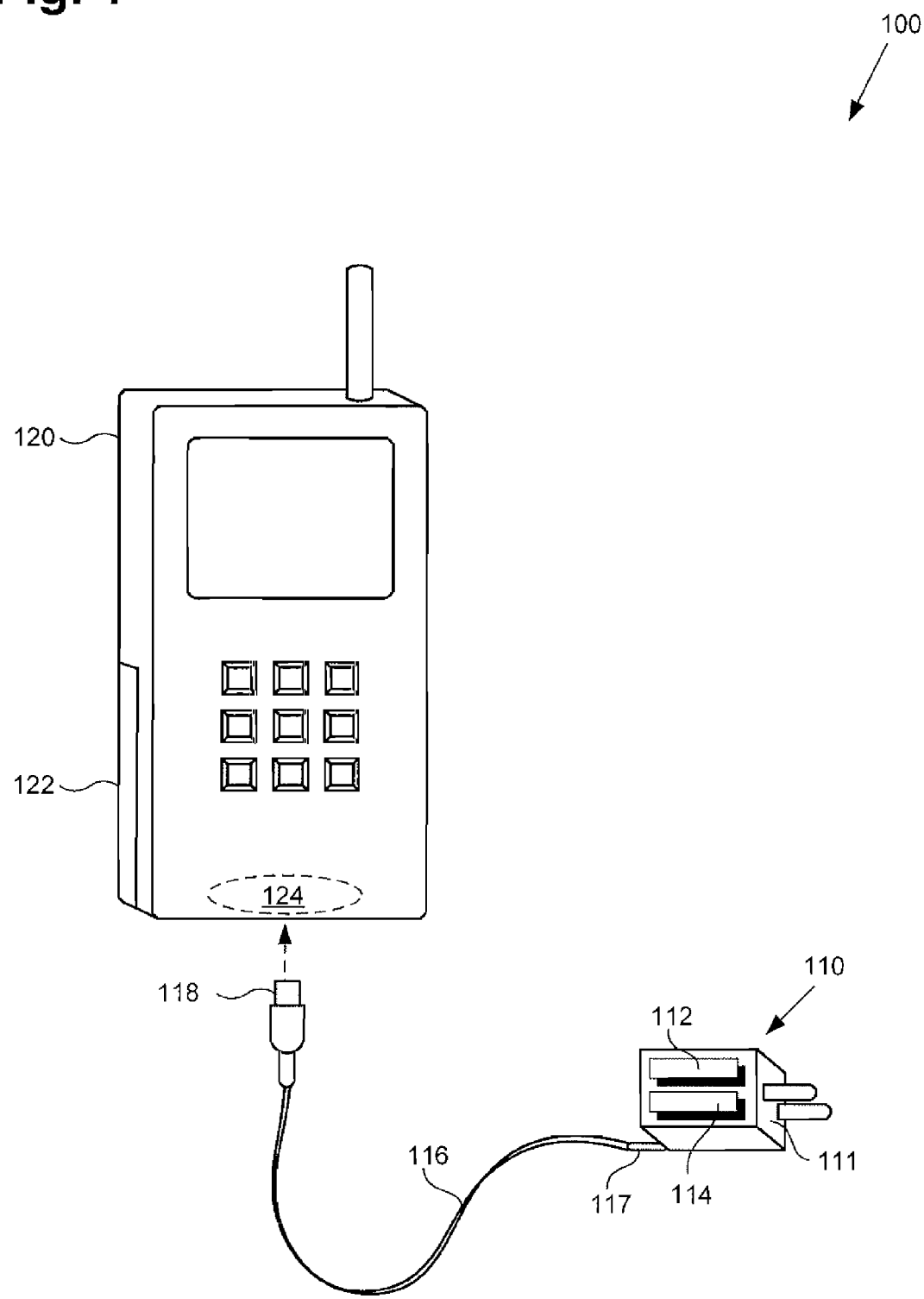
FIG. 1 illustrates a modular view of a smart power delivery system, according to one embodiment of the present invention.

The present invention is directed to a smart power delivery system and related method. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings. It should be understood that unless noted otherwise, like or corresponding elements among the figures may be indicated by like or corresponding reference numerals. Moreover, the drawings and illustrations in the present application are generally not to scale, and are not intended to correspond to actual relative dimensions.

Conventional power delivery systems suffer from many inefficiencies tied to their inability to be used universally. For example, at the end of the life of a typical electronic device, its power delivery system is often simply thrown away because it cannot function with other electronic devices. Knowing this, manufactures typically build their power delivery systems as cheaply as possible, and instead rely on secondary voltage regulation schemes built into the electronic devices themselves to refine the supplied power. This almost invariably produces undesirable, life-shortening heat or other damaging effects within the electronic devices, which compounds the overall material waste, especially over multiple product iterations.

With respect to electrical inefficiency, conventional filtered power delivery systems trade off electrical efficiency and capacity for the cleanliness of their output power. As is known in the art, always-on noise filters, line conditioners, high-accuracy regulators and other safety features decrease overall efficiency by constantly siphoning off a portion of the available power, both while actively powering an electronic device (e.g., the trade off for benefitting from the feature) and while the electronic device itself is turned off or disconnected (e.g., in the form of a phantom load, as known in the art). Similarly, conventional variable power delivery systems, while able to service a larger number of electronic devices, also operate at a reduced electrical efficiency because they typically must have enough capacity enabled to power their peak power output, regardless of the actual power being delivered. Doing so means that they often draw more power than a conventional matched power supply would, and if they are left plugged in when not powering a device, they generate a substantial phantom load.

FIG. 1 illustrates a modular view of one embodiment of the present invention that is capable of overcoming the drawbacks and deficiencies of the conventional art. Smart power delivery system 100, in FIG. 1, includes power conversion unit (PCU) 110, electronic device 120 and wired power conduit 116. According to the embodiment shown in FIG. 1, PCU 110 can be configured to connect to a mains alternating current (AC) power line through a standard wall mounted electrical socket, using mains adapter 111, and to provide power to electronic device 120 using wired power conduit 116.

As shown in FIG. 1, wired power conduit 116 can be connected to PCU 110 through connector 117, which may be a fixed connection or a detachable modular connection, such as through a Universal Serial Bus (USB) interface plug-in connector, for example. Wired power conduit 116 can connect PCU 110 to electronic device 120 through modular connector 118, which may be a mini-USB connector, for example, or any modular connector suitable for providing an interface between wired power conduit 116 and an electronic device or system receiving power. Wired power conduit 116 can serve as a power transfer connection between PCU 110 and electronic device 120 and can be used to transfer power to power control circuitry 124 of electronic device 120 to operate electronic device 120 and/or charge battery 122 of electronic device 120.

It is noted that although the embodiment shown in FIG. 1 represents PCU 110 in combination with a particular electronic device, e.g., electronic device 120, that representation is provided merely as an example. More generally, PCU 110 may be used to provide power to various individual electronic devices and/or systems, each requiring its own specific voltage. Alternatively, PCU 110 may be a dedicated device configured to provide a variable output, such as a variable voltage or current, for example, to a specific electronic device or system. In any implementation, however, PCU 110 is configured to support a communication channel between itself and the electronic device or system to which it is connected.

As shown in FIG. 1, according to the embodiment of smart power delivery system 100, PCU 110 includes communication module 112 and power management module (PMM) 114. Communication module 112 can be configured to send and receive state information and/or operating parameters between electronic device 120 and PMM 114 over a communication channel established between PCU 110 and electronic device 120. In embodiments such as that shown in FIG. 1, in which power is transferred from PCU 110 to electronic device 120 over a wired connection, e.g., wired power conduit 116, the wired connection may also provide the communication channel for transfer of state information and/or operating parameters. For example, in one embodiment, wired power conduit 116 may comprise a more than one internal wire, one or more of which may be utilized for power transfer, and one or more of which may be utilized for communication. Communication module 112 can also be configured to support a separate wireless communication channel to electronic device 120, such as through a Bluetooth, Bluetooth LE, WiFi, Near Field Communication (NFC), or other suitable wireless communication protocol, for example, either in addition or as an alternative to a wired communication channel over wired power conduit 116.

PMM 114 may comprise, for example, a microcontroller having multiple digital and analog input/output ports coupled to communications module 112 and to, for example, a programmable variable power supply, as known in the art, and can be configured to use data received from communication module 112 to dynamically modify many different operating characteristics of the voltage and/or current delivered to electronic device 120 by specifying a particular voltage parameter, such as an output voltage parameter, for instance. In the process of modifying the voltage to conform to a particular voltage parameter, PMM 114 may also optimize the power delivery with respect to, for example, overall electrical efficiency.

In one example, the presence of communication module 112 and PMM 114 can be used to enable PMM 114 to adjust the output voltage level and required output voltage accuracy of a voltage delivered to electronic device 120 according to information received from the electronic device over a communication channel, rather than forcing electronic device 120 to use secondary, and therefore inefficient, voltage regulation situated within its own power control circuitry 124. Consequently, embodiments of the present invention enable reductions in the heat dissipated through electronic device 120 by dynamically adjusting the output voltage level after a communication link has been established, for example, which, along with optimizing the recharge of battery 122, may be particularly useful for extending the life of fast charging and/or small electronic devices. Further, embodiments of the present invention can adjust the output voltage accuracy, which allows PMM 114 to trade off efficiency and capacity for accuracy when electronic device 120 so requests, as explained above. Further still, by providing for the adjustment of the output voltage level according to information received from electronic device 120, embodiments of the present invention can be used to power many different electronic devices automatically without requiring a separate power delivery system for each, which dramatically extends the useful lifetime of PCU 110.

In another example implementation, PMM 114 can be configured to adjust the noise properties of the output voltage according to requirements requested by electronic device 120. In one embodiment of the present inventive concepts, PMM 114 can comprise a programmable switching voltage regulator that may generate different voltages by, for example, adjusting a pulse width of the switching mechanism, by adjusting a frequency of the switching mechanism, or by adjusting both, as is known in the art.

If, for example, electronic device 120 communicates that it has particularly troublesome output noise sensitivity at 2 MHz (e.g., a typical frequency for efficiently configured switching voltage regulators) while charging battery 122, but not, for example, at 1 MHz, PMM 114 can adjust the switching frequency and pulse width of its switching voltage regulator accordingly in order to reduce or eliminate noise at the offensive frequency while battery 122 is being charged. After electronic device 120 notifies PMM 114 that battery 122 is fully charged, PMM 114 can, for example, adjust its parameters to a more efficient mode for the particular voltage requested by electronic device 120, even though the mode may include noise propagated at, for example, 2 MHz. Additionally, PMM 114 can be configured to switch noise filters, such as, for example, line filters (e.g., filters that remove a mains frequency and harmonic ripples in the voltage output), in and out of the power delivery path depending on the requirements communicated by electronic device 120. As explained above, an always-connected filter imposes a power loss, so the ability to programmatically disconnect such filters when they are not needed increases the general efficiency of PCU 110.

In another example, the present inventive concepts allow electronic device 120 to negotiate peak current needs with PMM 114 so that electronic device 120 will not attempt to draw more current than PCU 110 can provide. For example, electronic device 120 may be able to optimize a fast charge current based upon exchanged information about the power delivery capability of PCU 110. Additionally, electronic device 120 can communicate its safe operating range (e.g., minimum and maximum current and/or minimum and maximum voltage) to PMM 114. Based on those parameters, PMM 114 can monitor the output current and, in the event of an excursion, either communicate the problem to electronic device 120 and re-negotiate, for example, an appropriate voltage setting or, especially if the communication fails or is too slow, enable a safety feature of PCU 110, where PCU 110 can either apply a safe mode or disconnect power to electronic device 120. Such a safe mode can comprise, for example, a standardized output voltage expected at an initial power connection (e.g., before any communication takes place), such as a nominal 5 V, coupled with a minimal peak current setting, such as 5-10 mA or 100-500 mA, for example, depending upon the particular implementation environment. In any event, the peak current setting is suitably selected so as to be small enough to preclude substantially any electrical damage yet be sufficient to power, for example, a connected electronic device's standardized communication circuitry. Alternatively, PCU 110 can be configured to disconnect power to electronic device 120 for a predetermined period of time, such as several minutes, for example, or indefinitely, in the event of an excursion or deviation from an identified safe operating range.

In similar fashion, electronic device 120 can also communicate its tolerance for transients in an output voltage, and PMM 114 can then either disconnect, apply the safe mode, or apply appropriate power conditioning elements to the output voltage, similar to how PMM 114 can be configured to switch noise filters in and out of the power delivery path, as described above.

Figure 2:
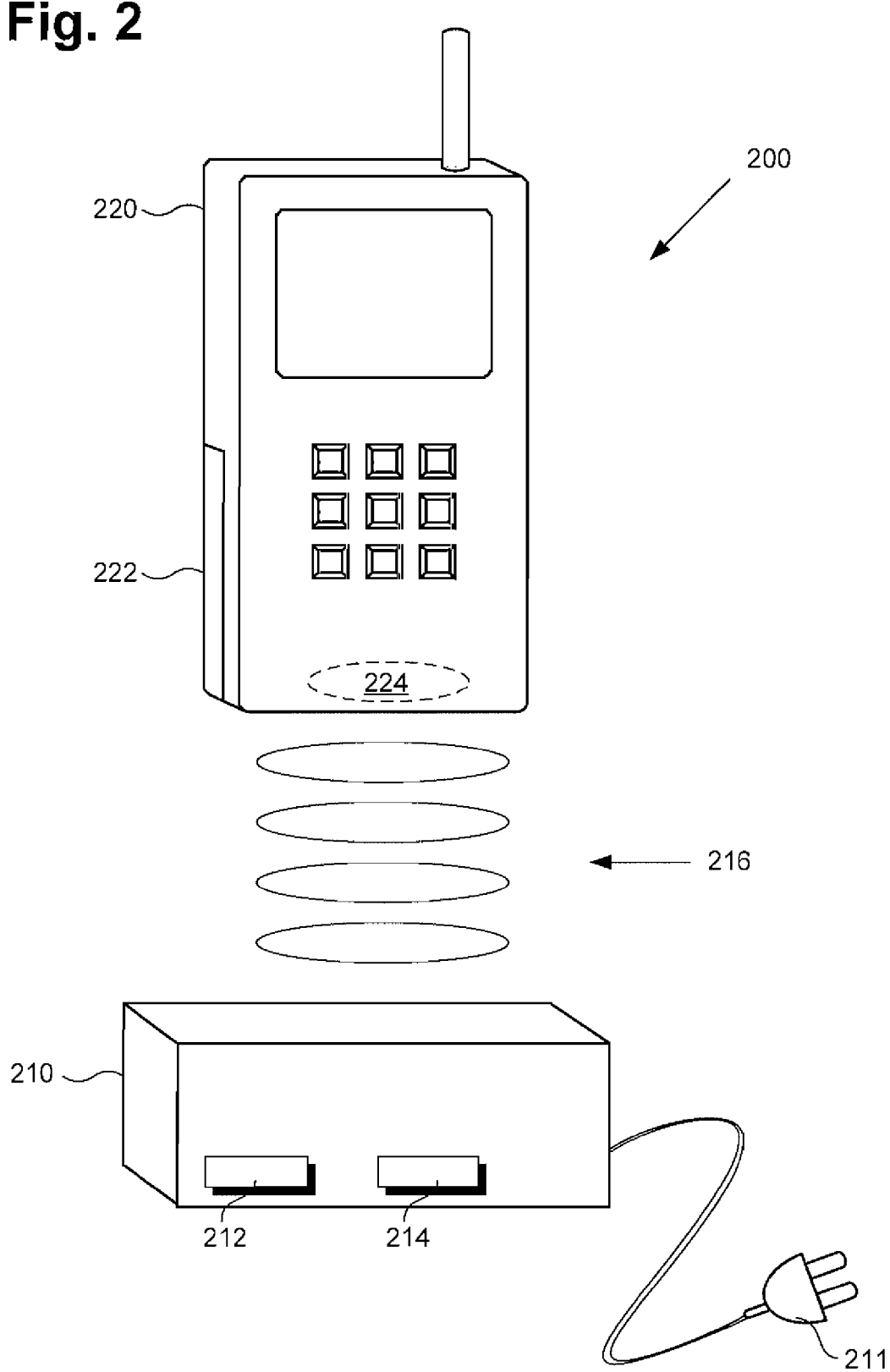
FIG. 2 illustrates a modular view of a smart power delivery system, according to a second embodiment of the present invention.

FIG. 2 illustrates an example of a smart power delivery system, according to the present inventive principles, which utilizes a wireless connection to transfer power to an electronic device. Smart power delivery system 200 includes PCU 210, which is configured to draw power through mains adapter 211 and comprises communication module 212 and PMM 214. Also shown in FIG. 2 is electronic device 220 having battery 222 and power control circuitry 224. PCU 210, communication module 212, PMM 214, mains adapter 211, electronic device 220, battery 222, and power control circuitry 224 correspond respectively to PCU 110, communication module 112, PMM 114, mains adapter 111, electronic device 120, battery 122, and power control circuitry 124 in FIG. 1. Likewise, each of the advantageous features enabled by use of communication module 112 and PMM 114 of PCU 110, as described above, can also be enabled by use of communication module 212 and PMM 214 of PCU 210.

According to the embodiment of FIG. 2, power transfer and communication are implemented wirelessly. Power may be transferred from PCU 210 to electronic device 220 through wireless power conduit 216 by inductive coupling, or resonant inductive coupling, for example, as known in the art. In one embodiment, communication module 212 can be configured to use wireless power conduit 216 as a wireless communication channel. Communication module 212 can also be configured to support any suitable wireless communication link independent of the inductive link used for power transfer, such as a Bluetooth, Bluetooth LE, WiFi, or NFC mediated link, for example, either in addition to or as an alternative to a wireless communication channel established over wireless power conduit 216.

Figure 3:
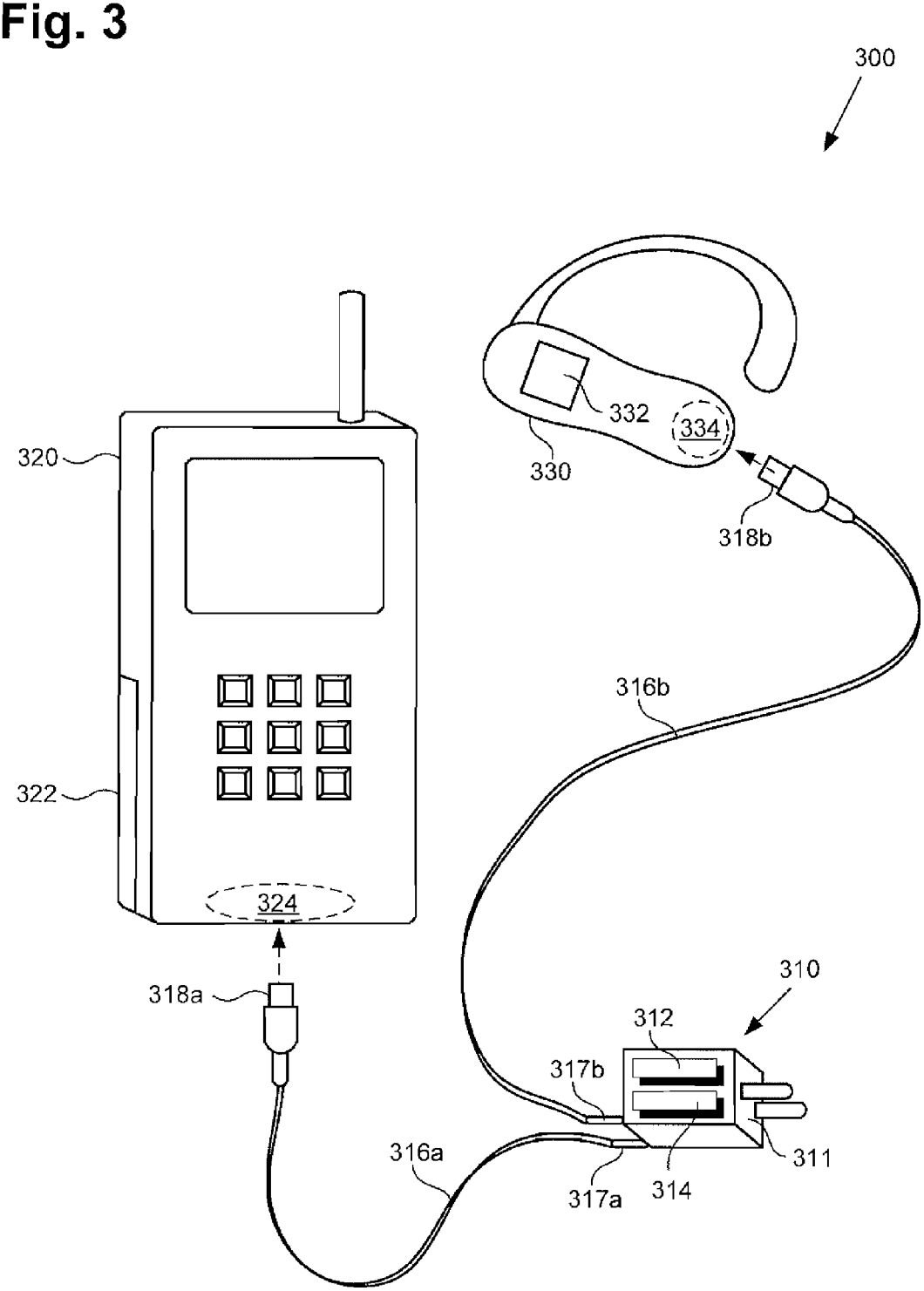
FIG. 3 illustrates a modular view of a smart power delivery system, according to a third embodiment of the present invention.

FIG. 3 illustrates a further example of a smart power delivery system, according to the present inventive principles, which provides a plurality of power connections to a corresponding plurality of electronic devices. Smart power delivery system 300 includes PCU 310, which can comprise communication module 312 and PMM 314, and, as shown in FIG. 3, is configured to draw power through mains adapter 311. Also shown in FIG. 3 are electronic devices 320 and 330, having respective batteries 322 and 332, and respective power control circuits 324 and 334, connected to PCU 310 through respective wired power conduits 316*a* and 316*b*, each having respective connectors 317*a* and 317*b* and respective modular connectors 318*a* and 318*b*. PCU 310, communication module 312, PMM 314, mains adapter 311, electronic devices 320 and 330, batteries 322 and 332, power control circuits 324 and 334, wired power conduits 316*a* and 316*b*, connectors 317*a* and 317*b*, and modular connectors 318*a* and 318*b* correspond respectively to PCU 110, communication module 112, PMM 114, mains adapter 111, electronic device 120, battery 122, power control circuitry 124, wired power conduit 116, connector 117, and modular connector 118, in FIG. 1. Likewise, each of the advantageous features enabled by use of communication module 112 and PMM 114 of PCU 110, as described above, can also be enabled by use of communication module 312 and PMM 314 of PCU 310, but with respect to each connected electronic device 320 and 330, as explained more fully below.

It is noted that, unlike an electronic device such as a laptop or desktop computer, the embodiment of smart power delivery system 300 including PCU 310 lacks a user interface. It is further noted that, unlike conventional solutions for providing power to more than one powered device concurrently, such as a USB hub, for example, embodiments of the present invention may be configured to power multiple diverse devices using correspondingly divers power conduit and connector types.

In embodiments such as that shown in FIG. 3, in which PCU 310 provides more than one power connection (e.g., wired power conduits 316*a* and 316*b*), optimum settings for the entire smart power delivery system 300 can be negotiated to best meet each electronic devices needs by, for example, using a operating mode chosen by PMM 314 according to information it receives from, for example, electronic devices 320 and 330. For instance, if both electronic devices 320 and 330 can communicate to PMM 314 that they are, for example, willing to negotiate lower current needs over a period of time (e.g., for staggered charging, or for extended periods of "sleep mode," where an electronic device enters a low power, inoperative mode until awakened by some external signal), PMM 314 can enter a "smart" mode where it can negotiate and apply a partitioning method proffered by electronic devices 320 and 330, for example. Possible partitioning methods include, but are not limited to: first come, first served; programmed prioritization (e.g., a user selected priority manually stored in each electronic device), quickest time to charge all devices, time-interval partitioning (e.g., 10 minutes for first device, then 10 minutes for second device, repeated), or equal current partitioning. To illustrate one possible method, if electronic devices 320 and 330 both request 500 mA of charging current, but PCU 310 only supports 600 mA, an equal current partitioning method may be used to allocate 300 mA of charging current to each device while both are charging.

If, instead, only electronic device 320 is willing to negotiate, and electronic device 330 only offers its typical operating parameters, PMM can enter a "brute-force" mode where it communicates the problem to electronic device 320 and can then select a partitioning method based on the willingness of electronic device 320 to defer or reduce its power requirements. Additionally, PMM 314 may switch one device to the safe mode described above while using the majority of its capacity to power the other device. Notably, the safe mode can also be automatically applied to any device that is connected to PCU 310 but refuses or is unable to communicate with PMM 314. Moreover, in instances in which PCU 310 acts to disconnect power from one or both of electronic devices 320 and 330, PCU 310 may be configured to forewarn the affected devices ahead of implementing the change, in order to enable their graceful powerdown.

Figure 4:
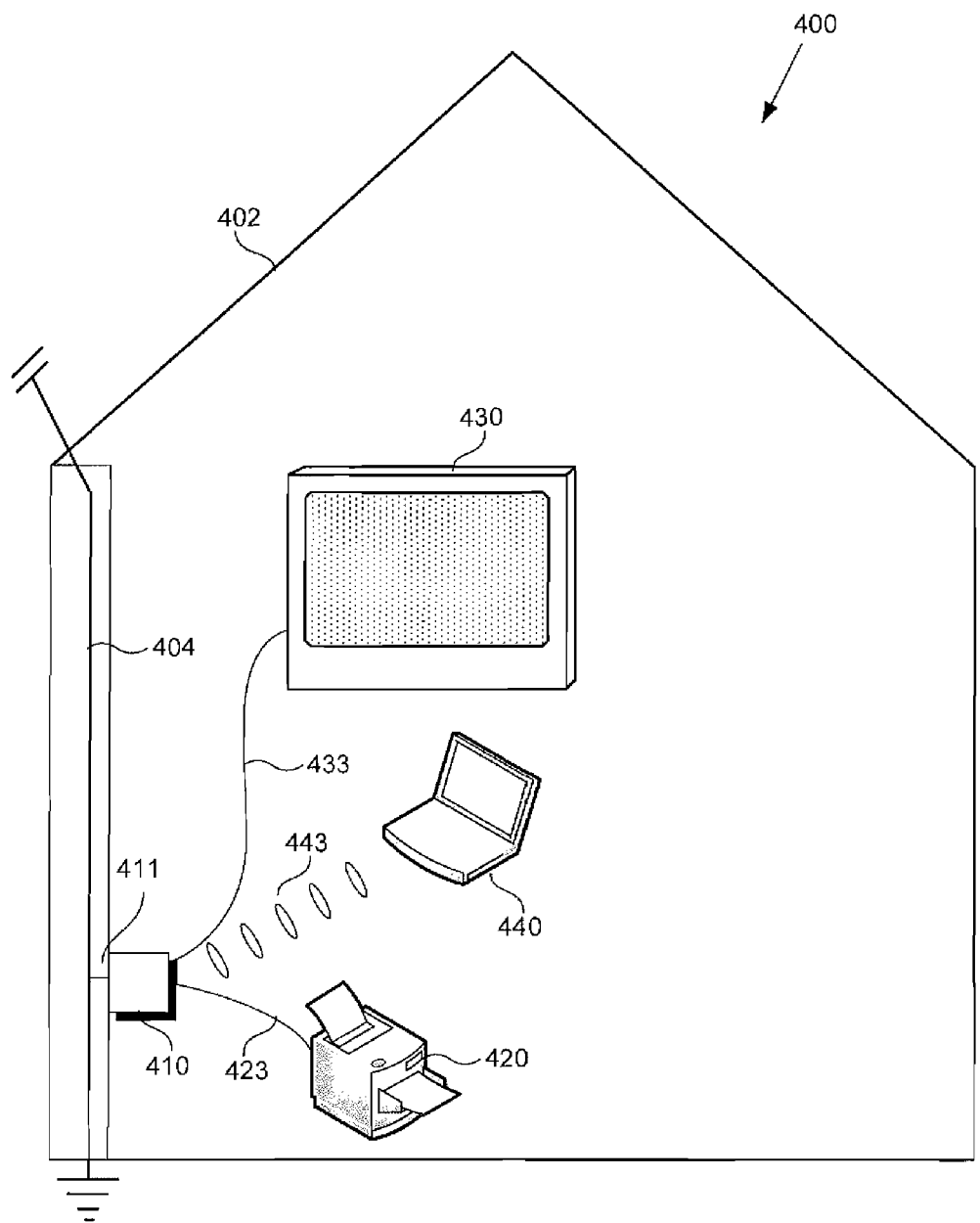
FIG. 4 illustrates a modular view of a smart power delivery system, according to a fourth embodiment of the present invention.

FIG. 4 illustrates an example of a smart power delivery system, according to the present inventive principles, which, like the embodiment depicted in FIG. 3, provides a plurality of power connections to a corresponding plurality of electronic devices, but where the devices have significantly different power needs and use different power conduits, substantially simultaneously. Smart power delivery system 400 includes PCU 410, which is configured to draw power through mains adapter 411 and comprises a communication module and a PMM. Also shown in FIG. 4 are house 402, house mains 404 and typical household electronic devices such as printer 420, television 430 and laptop 440 connected to PCU 410 through wired power conduits 423 and 433 and wireless power conduit 443, respectively. PCU 410, the communication module, the PMM and mains adapter 411 correspond respectively to PCU 310, communication module 312, PMM 314 and mains adapter 311 in FIG. 3. Likewise, each of the advantageous features enabled by use of communication module 312 and PMM 314 of PCU 310, as described above, can also be enabled by use of communication module and PMM of PCU 410.

In embodiments such as that shown in FIG. 4, in which PCU 410 provides constant power to some electronic devices (e.g., printer 420 and television 430) and intermittent power to other electronic devices (e.g., laptop 440), PCU 410 can be configured to draw enough power from house mains 404 and have enough capacity to power all connected electronic devices simultaneously, each at its own specifically requested voltage and with its own specifically requested voltage parameters, such as those discussed above. Similar to features described above, each connected device can negotiate a varying voltage over a period of time in order to optimize its power usage for its own particular operating mode. In addition, PMM can switch capacity in and out of the power delivery path in order to increase overall power efficiency, similar in fashion to switching filters in and out of a power delivery path as described above. Also, as shown in FIG. 4, according to the embodiment depicted as smart power delivery system 400, PCU 410 can be configured to deliver power to electronic devices through wired and wireless power conduits (e.g., wired power conduits 423 and 433 and wireless power conduit 443) substantially simultaneously. Moreover, in an alternative embodiment not explicitly shown in FIG. 4, PCU 410 may be implemented as one of several PCUs occupying a common power strip, for example, in which mains adapter 411 is shared by each of the PCUs located on the power strip.

In addition to the advantages previously attributed to PCUs 110, 210, and 310, PCU 410 may include features facilitating coordination and control of substantially simultaneous power delivery to a variety of powered devices, such as printer 420, television 430, and laptop 440. For example, in some embodiments, PCU 410 may comprise a low power detection circuit to recognize when a load, e.g., printer 420, television 430, or laptop 440 has been added. In that way, PCU 410 can detect the presence of a new load and initiate communications and/or negotiations with the load to optimize power delivery for all loads connected to PCU 410. As another example, in some embodiments, PCU 410 may include integrated TRIAC circuitry to further enhance its ability to manage power distribution in the face of varying power demands from printer 420, television 430, and laptop 440, for example.

Figure 5:
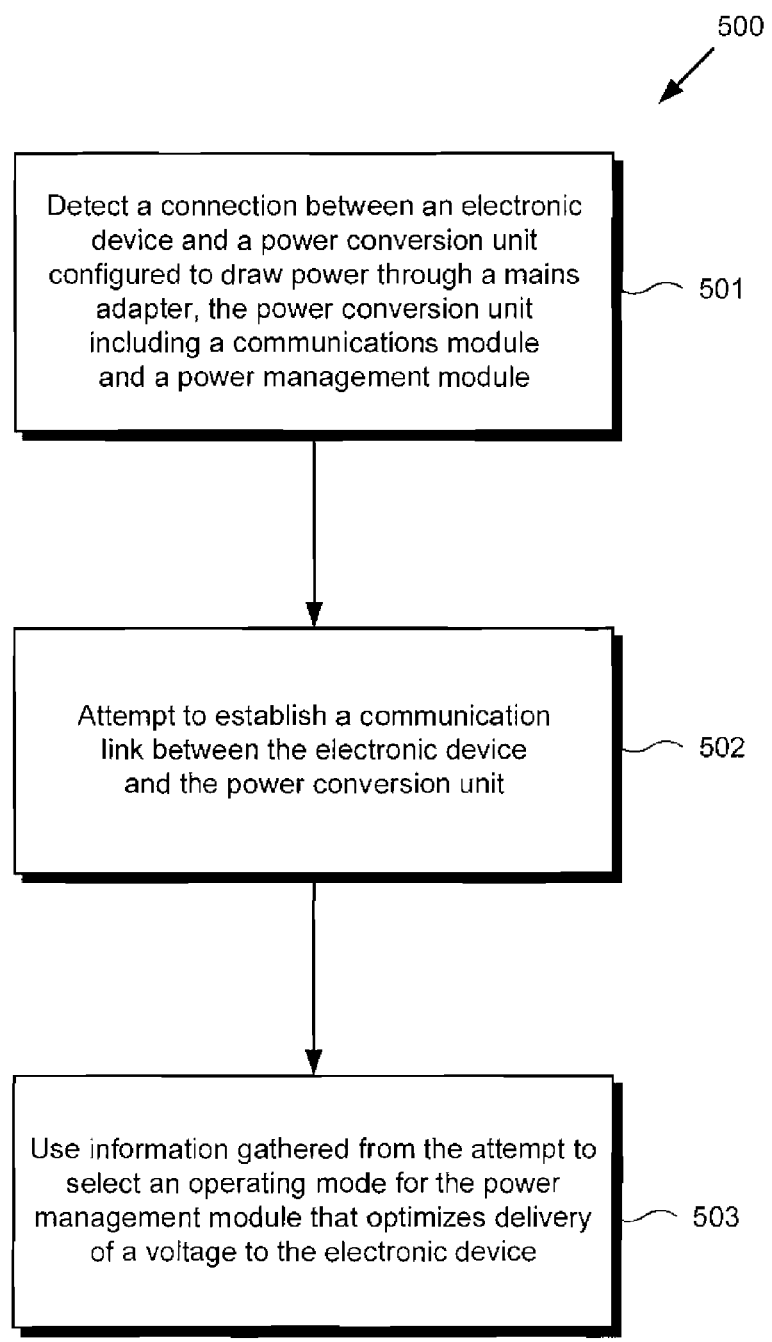
FIG. 5 shows a flowchart illustrating steps taken to implement a method for delivering power, according to an embodiment of the present invention.

FIG. 5 shows a flowchart illustrating a method for delivering power to an electronic device according to an embodiment of the present invention. Certain details and features have been left out of flowchart 500 that are apparent to a person of ordinary skill in the art. For example, a step may consist of one or more substeps or may involve specialized equipment or materials, as known in the art. Steps 501 through 503 indicated in flowchart 500 are sufficient to describe one embodiment of the present invention; however, other embodiments of the invention may make use of steps different from those shown in flowchart 500.

Referring now to step 501 of the method embodied in FIG. 5, step 501 of flowchart 500 comprises detecting a connection between an electronic device and a PCU. The electronic device may be, for example, any of the electronic devices discussed above, and may or may not have an internal power source, such as a battery. The PCU can comprise a communication module and a PMM, and can be configured to draw power from a mains adapter, such as the PCUs described above. The detected connection may be over a wired or wireless power conduit, a wired or wireless communication channel, or any combination of those, and can be detected by, for example, a cooperative effort between the communication module and the PMM, or by the PMM alone through a change in, for example, a measured output impedance of the PCU.

Continuing with step 502 in FIG. 5, step 502 of flowchart 500 comprises attempting to establish a communication link between the electronic device and the PCU. To explain, upon detection of a connection, as described in step 501, the communication module of the PCU may attempt to communicate with the connected electronic device by, for example, sending a query over a wired or wireless communication channel. The communication module may initiate the attempt itself, for example, or may do so at the request of the PMM.

Moving now to step 503 in FIG. 5, step 503 of flowchart 500 comprises using the information gathered from the communication attempt performed in step 502 to select an operating mode for the PMM that optimizes the output voltage delivered to the electronic device. Information gathered from the attempt may include, for example, a requested charging voltage, a specific filtering mechanism, or a specific voltage to be supplied at some future time. Optimizing the output voltage may include, but is not limited to, modifying the output voltage to conform to a specific output voltage parameter or simply disconnecting the electronic device from the PCU. For instance, in the event that the electronic device does not or cannot communicate with the PCU, the PMM may choose to either disconnect the electronic device entirely or, for example, apply a safe mode, as described above, to the connection to the electronic device. If, alternatively, the electronic device communicates a particular noise susceptibility and an output voltage level to be supplied at some future time, for example, the PMM may choose to disconnect the device until that time, rather than apply a safe mode and a noise filter, for example, in order to maximize the overall efficiency of the system while the electronic device is connected. As can be seen, the operating mode selection process allows the PMM to maximize the efficiency of the system while taking into account information assembled from the attempted communication, thereby optimizing the voltage provided to the electronic device.

Therefore, by providing a smart power delivery system having the ability to automatically communicate and negotiate with connected electronic devices, and also having the ability to programmatically adjust a wide range of output voltage characteristics as well as overall capacity in response to those communications and negotiations, the present inventive concepts provide a smart power delivery system that can significantly reduce waste, both in the form of material resources as well as electrical energy, by being capable of conveniently powering a wide variety of electronic devices.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

What is claimed is:

1. A smart power delivery system comprising:
   a power conversion unit (PCU) configured to draw power through a mains adapter, the PCU including a communication module and a power management module (PMM);
   a power conduit configured to connect the PCU to a first electronic device;
   the communication module and the PMM being configured to
   receive a first control signal from the first electronic device, the first control signal including a safe operating voltage range of the first electronic device; and
   modify a first output voltage of the PCU based on the safe operating voltage range of the first electronic device that is included in the first control signal,
   wherein the power conduit provides the first output voltage to the first electronic device,
   receive a second control signal from a second electronic device, the second control signal including a safe operating voltage range of the second electronic device, wherein
   the PCU simultaneously provides a second output voltage to the second electronic device based on the safe operating voltage range of the second electronic device, wherein the first output voltage being different from the second output voltage, and the PMM is configured to negotiate current draw for allocation to the first electronic device and the second electronic device and
   the PMM is configured to operate in a smart mode in which the PMM negotiates and applies a current partitioning method to the first electronic device and the second electronic device, the current partitioning method applied by the PMM includes at least one of first-come-first-served method, a programmed prioritization method, a quickest time to charge the first electronic device and the second electronic device method, and an equal current partitioning method.

2. The smart power delivery system of claim 1, wherein the power conduit comprises a wired power connection.

3. The smart power delivery system of claim 1, wherein the power conduit comprises a wireless power connection.

4. The smart power delivery system of claim 1, wherein the communication module is configured to form a communication channel over the power conduit.

5. The small power delivery system of claim 1, wherein the communication module is configured to form a wireless communication channel separate from the power conduit.

6. The smart power delivery system of claim 1, wherein the communication module and the PMM are configured to communicate with the first electronic device and receive a voltage parameter, the first output voltage provided to the first electronic device being modified to conform to the voltage parameter.

7. The smart power delivery system of claim 1, further comprising:
   a second power conduit connecting the PCU to the second electronic device, the PCU being configured to provide the second output voltage provided to the second electronic device over the second power conduit.

8. The smart power delivery system of claim 7, wherein at least one of a first power conduit and the second power conduit comprises a wireless power conduit.

9. The smart power delivery system of claim 7, wherein the communication module and the PMM are configured to communicate with the first electronic device and the second electronic device and negotiate first and second voltage parameters, the first output voltage and the second output voltage provided respectively to the first electronic device and the second electronic device being modified to conform to the respective first and second voltage parameters.

10. A power conversion unit (PCU) for use in a smart power delivery system, the PCU comprising:
    a communication module;
    a power management module (PMM);
    the communication module and the PMM being configured to:
    receive a first control signal from a first electronic device, the first control signal including a safe operating voltage range of the first electronic device;
    modify a first output voltage of the PCU based on the safe operating voltage range of the first electronic device that is included in the first control signal;
    provide the first output voltage to the first electronic device, and
    receive a second control signal from a second electronic device, the second control signal including a safe operating voltage range of the second electronic device, wherein
    the PCU simultaneously provides a second output voltage to the second electronic device based on the safe operating voltage range of the second electronic device, wherein the first output voltage being different from the second output voltage, and the PMM is configured to negotiate current draw for allocation to the first electronic device and the second electronic device and
    the PMM is configured to operate in a smart mode in which the PMM negotiates and applies a current partitioning method to the first electronic device and the second electronic device, the current partitioning method applied by the PMM includes at least one of first-come-first-served method, a programmed prioritization method, a quickest time to charge the first electronic device and the second electronic device method, and an equal current partitioning method.

11. The PCU of claim 10, wherein the communication module is configured to communicate with the first electronic device over a wireless communication channel.

12. The PCU of claim 10, wherein the communication module and the PMM are configured to communicate with the first electronic device and receive a first voltage parameter, the first output voltage being modified to conform to the first voltage parameter.

13. The PCU of claim 12, wherein the first voltage parameter is a first output voltage level required by the first voltage parameter provided by the first electronic device.

14. The PCU of claim 12, wherein the first voltage parameter identifies a first output voltage accuracy required by the first electronic device.

15. The PCU of claim 12, wherein the first voltage parameter is an output noise sensitivity of the first electronic device.

16. The PCU of claim 12, wherein the first voltage parameter is a tolerance for transients in the first output voltage provided to the first electronic device.

17. A method for delivering power to a first electronic device and a second electronic device with a different power requirement, the method comprising:
- detecting a connection between a power conversion unit (PCU) configured to draw power through a mains adapter and the first electronic device, the PCU including a communication module and a power management module (PMM);
- attempting to establish a communication link between the PCU and the first electronic device;
- receiving over the communication link a first control signal from the first electronic device, the first control signal including a first safe operating voltage range of the first electronic device;
- using the communication link to select an operating mode for the PMM, the operating mode configured to modify a first output voltage of the PCU based on the first safe operating voltage range that is included in the first control signal;
- providing the first output voltage to the first electronic device;
- receiving a second control signal from the second electronic device, the second control signal including a second safe operating voltage range of the second electronic device, the first safe operating voltage range and second safe operating voltage range being different ranges; and
- simultaneously providing a second output voltage to the second electronic device and the PMM is configured to negotiate current draw for allocation to the first electronic device and the second electronic device and
- operating the PMM in a Smart mode in which the PMM negotiates and applies a current partitioning method to the first electronic device and the second electronic device, the current partitioning method applied by the PMM includes at least one of first-come-first-served method, a programmed prioritization method, a quickest time to charge the first electronic device and the second electronic device method, and an equal current partitioning method.

18. The method of claim 17, wherein the operating mode for the PMM is a safe mode when said attempting result in a failure to communicate with the first electronic device.

19. The method of claim 17, wherein result of the attempting comprises a communication of a voltage parameter from the first electronic device, and where the first output voltage provided to the first electronic device is modified to conform to the voltage parameter.

20. The method of claim 17, further comprising:
- detecting a second connection between the PCU and the second electronic device;
- attempting to establish a second communication link between the PCU and the second electronic device;
- using a result of the attempting to establish a second communication link to select a second operating mode for the PMM, the second operating mode configured to optimize the first output voltage provided to the first electronic device and the second output voltage provided to the second electronic device.

* * * * *